Patented Sept. 10, 1935

2,014,342

UNITED STATES PATENT OFFICE 2,014,342

METHOD OF PRODUCING SOLUBLE COCOA

Gurney O. Gutekunst, Rochester, N. Y., assignor of twenty one-hundredths to Charles E. Rogers and thirty-one one-hundredths to Russell H. Rogers, both of Detroit, Mich.

No Drawing. Application June 29, 1931, Serial No. 547,796

2 Claims. (Cl. 99—11)

This invention relates to a process of manufacture of a completely soluble cocoa, the object being to provide a liquid filtrate or syrup in which the cocoa is in permanent solution.

Cocoa in what is termed "soluble" form is at present produced commercially but such cocoa is not even approximately completely soluble as considerable insoluble matter is included. By my process, as hereinafter more specifically given, I am able to provide a syrup in which the cocoa remains in solution or a completely soluble powder. The preferred process includes as one of its steps the well known "Dutch process" or alkalizing process introduced in commerce by one Van Houten. This first step is as follows:

The cocoa beans are lightly roasted so that the shells may be removed and the nibs are then placed in a container and an alkalizing solution about four per cent by weight in proportion is added. This container or drum is then revolved or the contents agitated until the nibs are thoroughly moistened. They are then lightly reroasted to remove excess moisture. A divergent form of this first or alkalizing step is as follows:

The cocoa beans are slightly roasted and shelled, ground into a liquor, the liquor placed in a steam-jacketed mixer and the alkalizing solution added. After a thorough mixing, sufficient heat is applied and the moisture introduced by the solution is evaporated. The alkaline compounds generally used are potassium or sodium carbonate.

Either of these methods, that is, the treating of the bean or of the liquor in which the ground beans are mixed are hereinafter termed the "Dutch process" as the first or-alkalizing step of my process, which is the preferred first step as the cocoa resulting from such step is better adapted or in better physical and chemical condition for the succeeding steps than is the case with what is known to the trade as natural processed cocoa.

The succeeding steps of the process may vary considerably both as to the proportion of the cocoa to water, the time period and temperature of the heating, and as to the quantity of the enzyme used. Preferably the succeeding steps are as follows:

*First.*—To 175 gallons of water is added 167.4 pounds of cocoa of the first step, bring the mixture to boiling point and boil for one-half minute, then cool the same to approximately 50 degrees C. As an assistance in cooling 24 gallons of cold water is added to the above mixture. However, if the cooling does not require this speeding of the operation, 189 gallons of water should be used to which is added 167.4 pounds of cocoa and the mass then cooled.

*Second.*—Subsequent to cooling, add one gallon of water in which diastatic enzyme or an enzyme having a diastatic action sufficient to produce the desired chocolate flavor have been dissolved.

The mixture is then held at 50-52 degrees C., for one hour, the temperature is then raised to 63-65 degrees C., and held at that temperature for one-half hour, then the temperature is raised to 69-70 degrees C., and held at that temperature for one-half hour, it being pointed out that the time taken to raise the temperature is included in the one-half hour periods so that the entire treatment of this step requires a two-hour period.

*Third.*—The mixture is filtered and if a vacuum filter is utilized the mixture should be cooled to 35 degrees C., or below to prevent boiling of the filtrate under vacuum. If a pressure filter is used, the cooling of the mixture may be dispensed with.

*Fourth.*—The filtrate is then measured and enough water is added to make 200 gallons. This filtrate is then brought to 50 degrees C., and 167.4 pounds of cocoa is added. The filtrate and added cocoa are then held at 50-52 degrees C., for one hour and 63-65 degrees C., for one-half hour and at 69-70 degrees C., for one-half hour as in the previous second step. The mixture is then again filtered and then the filtrate is again boiled and filtered and the resultant filtrate is to be used in the making of a syrup. At this point the filtrate should be checked for color, density etc., and the yield of the filtrate is ordinarily 80 to 85 per cent, that is, 160 to 170 gallons for each two hundred gallons of mixture of the fourth step. This depends considerably upon the type of cocoa used and the manner of filtering. To make a syrup, the final filtrate is to be mixed with other ingredients in desired proportions commonly in use as for instance malt sugar, cane sugar and flavoring matter.

The fourth step can be eliminated although I have found that a somewhat better result is secured by the inclusion of this step.

If it is desired to use a thin syrup as it is mixed it is then put into containers and sterilized. If a thick syrup is to be made, the syrup is mixed as above stated without the flavor and is concentrated to 35-36 degrees Beaumé and the flavor then added and the syrup placed in containers and sterilized.

The thin syrup above mentioned is to be mixed with milk in the proportion of one part of syrup with three parts of milk. The concentrated syrup is to be mixed with milk in the proportion of one part of syrup to eight or nine parts of milk according to taste.

This product resulting from the described process is also the first form of cocoa of a character enabling the same to be sprayed to secure a dry powder. The product of the process may be either dried alone or mixed with other substances such as sugar prior to the drying step. Cocoa as heretofore found in commerce even when put in solution, contains insoluble matter which destroys the spray nozzles as it will soon form grooves in the nozzle and in a short period of time causes the spray to discharge in drops too large for the dry rooms to evaporate the water.

By my improved process the filtrate finally secured contains only the soluble constituents of the cocoa bean and this filtrate may be sprayed to secure a dry powder in any of the ordinary spray nozzles now used in the drying of milk. Thus, my new product—namely, cocoa in solution—is possible to be used in various ways as in the making of syrup or in preparation of a dry powder as may be desired.

The "Dutch processed" cocoa is found to give the best result as it appears in better physical or chemical condition for action by the enzyme and a greater quantity of the cocoa bean is digested as a point of more complete solubility than by any other known method, and the step of this process of greatest moment is the treatment of the "Dutch processed" cocoa by an enzyme and the product resulting therefrom rather than the use to which the filtrate may be put as in the making of a syrup above described. In other words, the invention is in the securing of the filtrate by a specific treatment of the cocoa after the manner hereinbefore described and as set forth in the appended claims.

The product of my improved process is distinguished from the products of many well known processes in its accentuated bitter chocolate flavor and its dark color and the fact that the product of my process is so distinguished from products of other processes is attributed to the fact that by my improved process the cocoa bean is first alkalized and is then treated with a suitable enzyme in the presence of sufficient water to make a liquid product and such liquid product of the recited steps is then filtered to eliminate any insoluble material. The alkalizing step prepares the bean for the succeeding steps, that is, by the alkalizing step the water soluble constituents of the bean are in such physical or chemical condition or state as to be dissolved out by the water and further the water is a vehicle for the enzyme which if applied in a completely dry form does not permeate the bean or so physically applied as to act chemically upon all particles. Therefore the alkalizing step and treatment with enzyme in the presence of water in quantity causes complete separation of the water soluble constituents from the insoluble portions of the bean and further enables the enzyme to act upon all particles whereby the constituents digestible by the enzyme treatment are to a degree hitherto unknown separated from the constituents of the bean that are insoluble in water or non-digestible by the enzyme. By the final filtration steps such insoluble constituents are removed and the product therefore to a degree materially in excess of that heretofore known contains substantially all of the constituents of the bean that are usable as food.

Having thus briefly described my invention, what I claim and desire to secure by Letters Patent of the United States is—

1. The process of securing a soluble cocoa which consists in first alkalizing the cocoa, then adding the alkalized cocoa to water in the neighborhood of an equal number of gallons to pounds of alkalized cocoa, treating the same with an enzyme having a diastatic action while heated to varying degrees from fifty to seventy degrees centigrade for approximately a two-hour period, filtering the mixture, then adding to this filtrate approximately the same amount of alkalized cocoa as first utilized, then holding the same at a temperature from fifty to seventy degrees centigrade for approximately a two-hour period and finally again filtering the mixture to provide a filtrate for use in the making of a syrup.

2. The method of securing a completely soluble cocoa which consists in first alkalizing the cocoa, then adding water thereto in approximately equal number of gallons to pounds of alkalized cocoa, then adding an enzyme having a diastatic action, holding the mixture at temperature not to exceed seventy degrees centigrade over a two-hour period, filtering the mixture, then adding water to the filtrate to make a total quantity approximately equal to the original quantity of water, then raising the temperature of the filtrate to about fifty degrees centigrade, adding a quantity of alkalized cocoa equal to the original weight, then heating the same for approximately a two-hour period to a temperature not to exceed seventy degrees centigrade, and then finally filtering the mixture to secure a filtrate free of insoluble matter.

GURNEY O. GUTEKUNST.